United States Patent
Cole et al.

[11] Patent Number: 6,158,927
[45] Date of Patent: *Dec. 12, 2000

[54] MILLING CUTTER

[75] Inventors: John M. Cole, Waterford, Mich.; Wolfried H. Mielert, Simsbury, Conn.

[73] Assignee: Cole Carbide Industries, Inc., Warren, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/031,853

[22] Filed: Feb. 27, 1998

Related U.S. Application Data

[63] Continuation-in-part of application No. 08/664,642, Jun. 17, 1996, Pat. No. 5,782,589.

[51] Int. Cl.⁷ .................................................. B23B 51/00
[52] U.S. Cl. .............................. 407/48; 407/64; 407/65; 407/113; 408/233
[58] Field of Search .................................. 407/34, 40, 42, 407/48, 54, 64, 65, 113; 408/228, 227, 233

[56] References Cited

U.S. PATENT DOCUMENTS

| | | |
|---|---|---|
| 2,575,239 | 11/1951 | Stephens . |
| 4,060,335 | 11/1977 | Holloway et al. . |
| 4,251,172 | 2/1981 | Durand . |
| 4,334,446 | 6/1982 | Field . |
| 4,423,989 | 1/1984 | Kress et al. ............................ 407/42 X |
| 4,525,109 | 6/1985 | Bylund .................................. 407/42 X |
| 4,588,331 | 5/1986 | Yoshinori .............................. 407/42 X |
| 4,721,422 | 1/1988 | Konwal . |
| 5,064,316 | 11/1991 | Stojanovski . |
| 5,259,707 | 11/1993 | Keller . |
| 5,348,426 | 9/1994 | Krupp . |
| 5,516,242 | 5/1996 | Andronica . |
| 5,580,194 | 12/1996 | Satran . |
| 5,632,576 | 5/1997 | Storch ................................... 407/54 X |
| 5,635,576 | 6/1997 | Storch . |
| 5,863,157 | 1/1999 | Harano et al. ........................ 407/48 X |

FOREIGN PATENT DOCUMENTS 686 345 A5   5/1992   Switzerland .

OTHER PUBLICATIONS

"Dapra Cutting Tools", (Advertisement) Cutting Tool Engineering, Apr. 1996, page 23.
"Conner–Type Spade Drills & Core Drills", The Gairing Tool Company, 1953.
"Throw–Away Style Drills & Holders", Allied Machine & Engineering Corp., Jan. 1991.

*Primary Examiner*—Henry W. H. Tsai
*Attorney, Agent, or Firm*—Harness, Dickey & Pierce, P.L.C.

[57] ABSTRACT

A milling cutter is provided including a tool holder and a cutting tool insert. The tool holder includes a mounting end portion and a cutting end portion. The cutting end portion includes a slot defined by first and second diagonal surfaces provided in an end of the cutting end portion. The first and second diagonal surfaces form a substantially V-shaped pocket for receiving the cutting tool insert. The cutting tool insert includes a substantially flat body member having a V-shaped seat portion and a cutting portion, the cutting portion includes a first cutting lobe and a second cutting lobe. A hole is provided which passes through the body member. A screw hole passes through the cutting end portion of the milling cutter which intersects the U-shaped pocket. A threaded portion of the screw hole is offset from a clearance portion of the screw hole to positively seat the V-shaped seat portion of the insert in the V-shaped pocket of the tool holder.

8 Claims, 5 Drawing Sheets

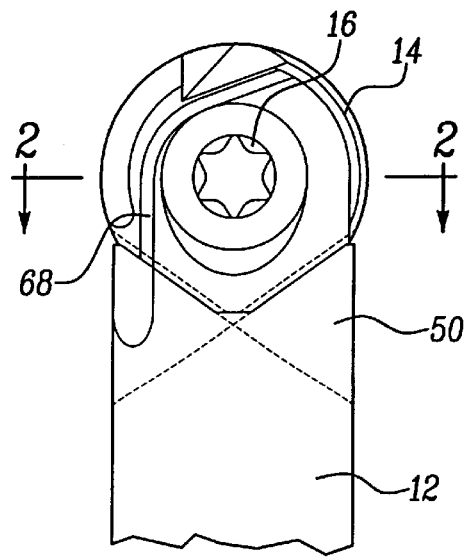
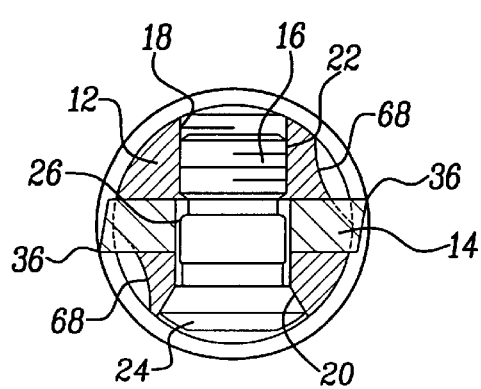
Fig-1
Fig-2
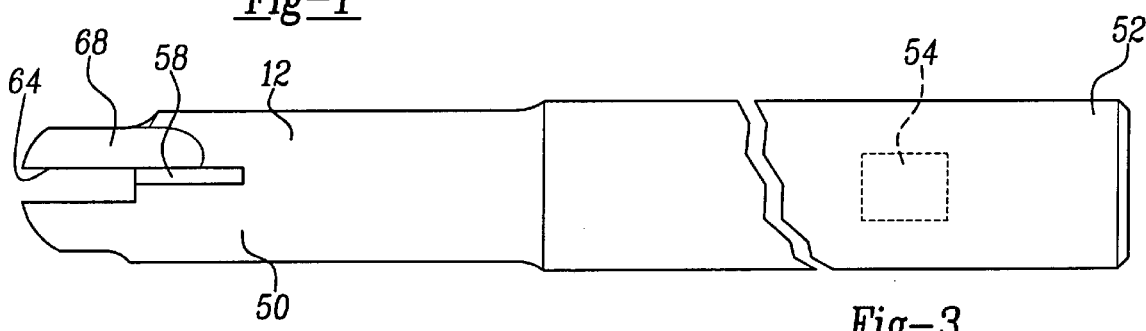
Fig-3
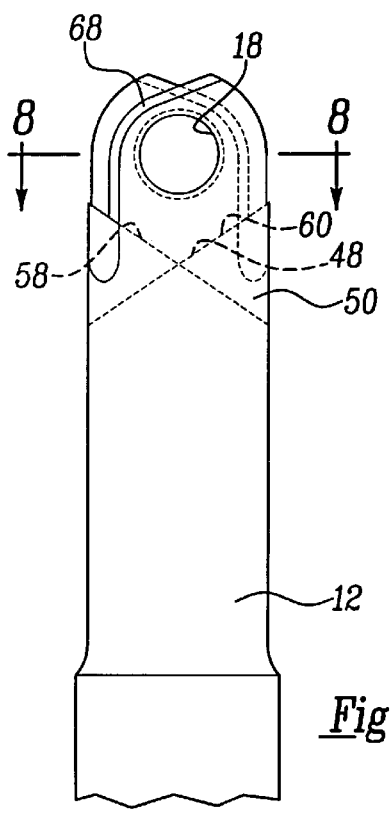
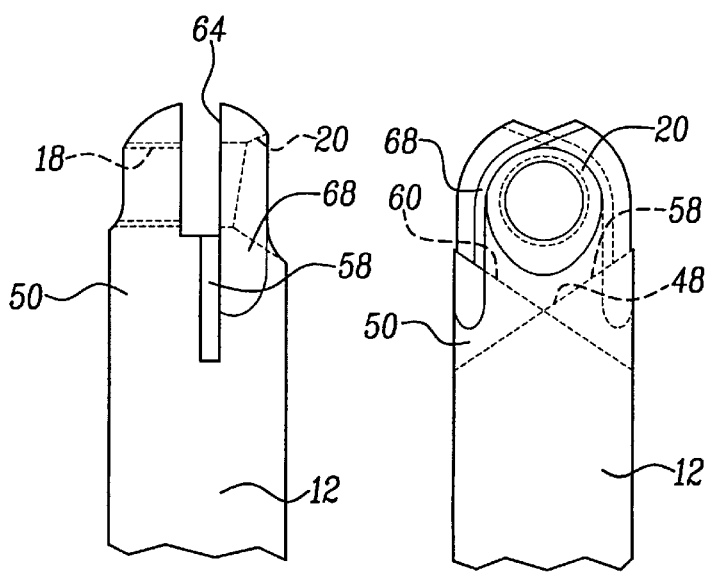
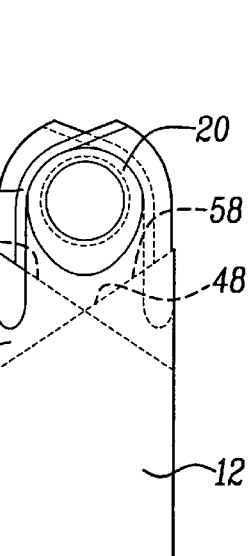
Fig-4  Fig-5  Fig-6

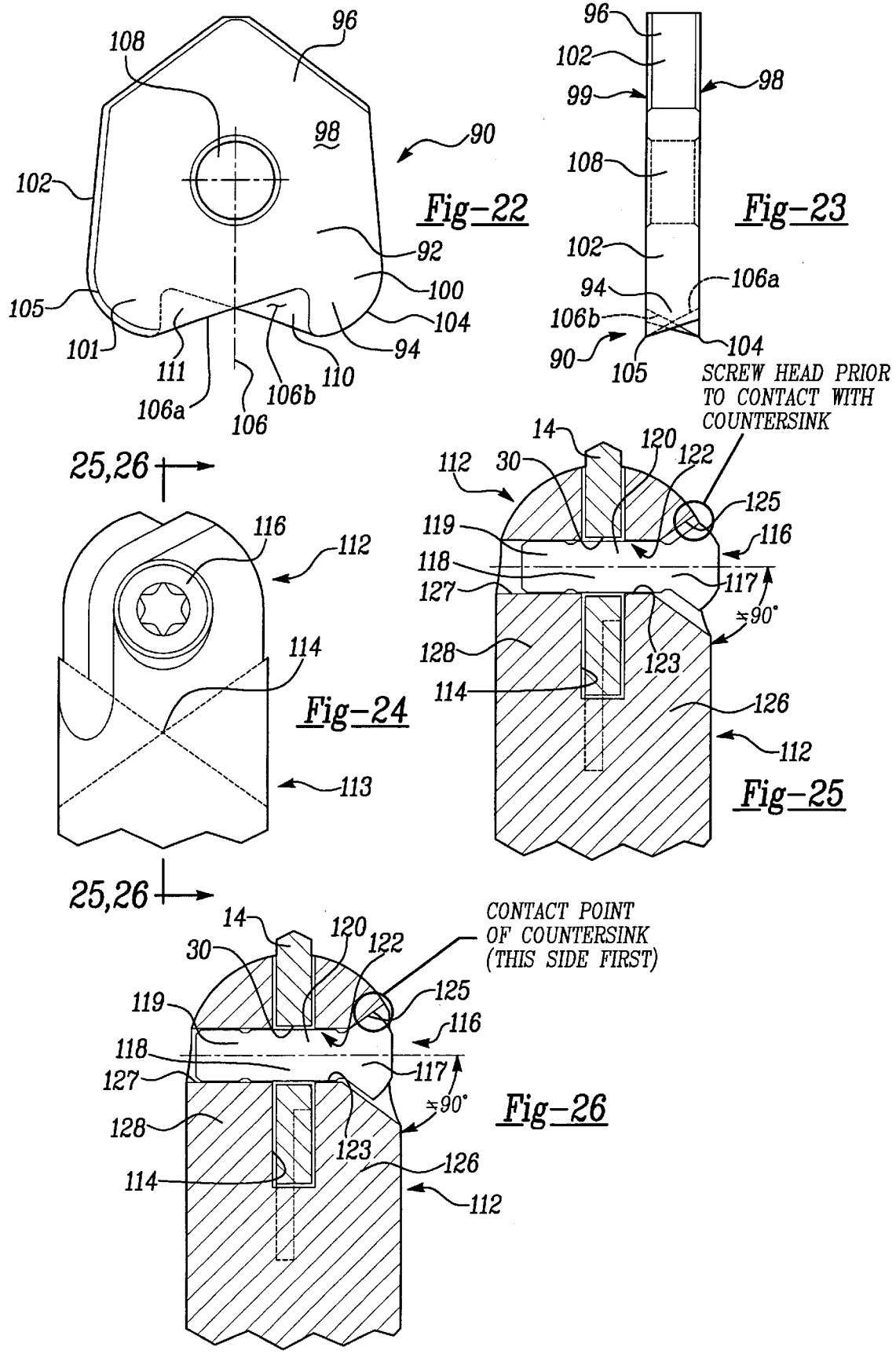

MILLING CUTTER

This is a continuation-in-part application of U.S. patent application Ser. No. 08/664,642, filed Jun. 17, 1996, now U.S. Pat. No. 5,782,589.

FIELD OF THE INVENTION

The present invention relates to a milling cutter, and more particularly, to a tool insert having a cutting portion that includes first and second cutting lobes.

DESCRIPTION OF BACKGROUND ART

Milling cutters are commonly used for profile and cavity milling in the auto, aircraft, die and mold industries, and in general manufacturing. In particular, the milling tools are used for profiling or copy milling for rapid prototyping. Plastic, non-ferrous, and ferrous materials are precisely milled using milling tools. Smooth blending and finishing of three-dimensional curves and shapes with software-generated tool paths is also accomplished. Cavity milling methods include roughing, finishing, spiral pocketing, Z-level milling, fillet and pencil tracing and cusp removing. As shown in FIGS. 17–19, milling cutters 10 can be used for step-over line milling, as shown in FIG. 17, side milling on steep walls as shown in FIG. 18, and corner radius milling as shown in FIG. 19. Modern milling cutters often include a tool holder and a replaceable cutting tool insert. The tool holder supports the cutting tool insert as the tool holder is rotated about its central longitudinal axis and the cutting tool insert is provided with a cutting surface for milling plastic, non-ferrous, and ferrous materials.

A problem with conventional milling cutters utilizing replaceable cutting inserts is that the cutting tool inserts are commonly not sufficiently supported by the tool holder. It is also difficult to ensure that the cutting tool insert is on a true center-line when put to use in its cutting mode. Thus, it is desirable in the art of milling cutters to provide a tool holder and cutting tool insert design which improves the tool holder's ability to properly support the tool insert under cutting loads.

A three axis milling machine is the most common machine for tool making, therefore the most widely used cutting tool insert for tool making is a ball nose insert. A ball nose insert, as shown in FIG. 17, has a semi-circular cutting edge. The ball nose insert can be used to manufacture sculpted surfaces with a three axis machine, including convex or concave shapes, quite accurately and economically. However, a ball nose insert has several distinct disadvantages. The cutting speed of a ball nose insert changes constantly along the cutting edge. The cutting speed of a ball nose insert is zero at the tool tip and reaches its maximum at the outer diameter of the tool. Because the cutting speed is zero at the tool tip, the resulting cutting surface has a duller appearance and a rougher surface. Furthermore, a zero surface speed at the tool tip results in faster tool wear and chipping or breaking of the cutting edge of the insert. A toroid cutting tool, as shown in FIG. 20, solves some of the problems encountered when using a ball nose insert. There is no area on the cutting edge of a toroid cutting tool where the cutting speed is zero. Furthermore, toroid cutters do not require the higher spindle speed requirements of a ball nose insert. However, there are also disadvantages with conventional toroid cutters. Conventional toroid cutters generally include two or more interchangeable inserts known as button inserts, which are held in place by a screw or a clamping finger. It is difficult to manufacture the inserts to tolerances that assure, as inserts are replaced, that a cutter with precise, repeatable cutting geometry will result. Repeatable cutting geometry allows metal removal that is equal in volume from one cutting edge to the next cutting edge, resulting in a balanced cutting action. Thus, it is desirable in the art of milling cutters to provide a cutting tool insert design which improves the quality of the cutting surface of a workpiece while also increasing the accuracy and efficiency of a machining operation.

SUMMARY OF THE INVENTION

Accordingly, it is an object of the present invention to provide a milling cutter design that allows for a near perfect alignment for centering of the insert with the tool holder.

It is another object of the present invention to provide a milling cutter having a tool holder which is capable of receiving lateral forces applied to the cutting tool insert when the cutting tool is subjected to cutting forces such that the forces cause the insert to be accurately retained more tightly or rigidly within a V-shaped pocket in the tool holder.

It is yet another object of the present invention to provide a V-shaped pocket configuration in the tool holder which allows for a straight through cut for manufacturing the V-shaped pocket in the tool holder and allowing for a near perfect match with a V-shape of a cutting tool insert.

It is yet another object of the present invention to provide a one-piece cutting tool insert having first and second cutting lobes that allow for a higher material removal rate while improving the surface finish.

It is yet another object of the present invention to provide a tool holder with an offset screw that allows the tool holder to more positively seat and align the cutting tool insert.

It is still another object of the present invention to provide a milling cutter with a tool holder which is specifically designed to support the cutting tool insert on a true center-line when put to use in its cutting mode.

These and other objects of the present invention are obtained by providing a milling cutter comprising: a tool holder including a mounting end portion and a cutting end portion, said cutting end portion including a slot defined by first and second diagonal surfaces provided in an end of said cutting end portion, said first and second diagonal surfaces forming a substantially V-shaped pocket; and a cutting tool insert including a substantially flat body member having a first side having a cutting surface on one edge thereof and a second identical side having a cutting surface on one edge thereof, a hole passing through said body member from said first side to said second side, and first and second surfaces adjacent and substantially perpendicular to said first and second sides, said first and second surfaces defining a V-shaped seat portion for seating said cutting tool insert in said V-shaped pocket of said tool holder.

The objects of the present invention are also obtained by providing a method of making a tool holder for holding a cutting tool insert, comprising the steps of: providing an elongated body portion having a mounting end portion and a cutting end portion; machining a first diagonal surface in an end of said cutting end portion on a first side of a centerline of said body portion having a width equal to one half a width of said cutting tool insert; and machining a second diagonal surface in said end of said cutting end portion on a second side of said centerline of said body portion having a width equal to approximately one half the width of said cutting tool insert; wherein said first and second diagonal surfaces form a slot having a V-shaped pocket for receiving said cutting tool insert.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 1 is a partial side view of a ball nose milling cutter according to the principles of the present invention;

FIG. 2 is a cross-sectional view along lines 2—2 of FIG. 1;

FIG. 3 is a first side view of a tool holder according to the principles of the present invention;

FIG. 4 is a second partial side view of a tool holder according to the principles of the present invention;

FIG. 5 is a partial side view of the tool holder of the present invention from the same side as shown in FIG. 3 with a screw head seat portion and internally threaded portion shown in phantom;

FIG. 6 is a third partial side view of the tool holder according to the principles of the present invention;

FIG. 22 is a plan view of a toroid insert according to the principles of the present invention;

FIG. 23 is a side view of the toroid insert shown in FIG. 22;

FIG. 24 is a partial side view of a tool holder with a screw threadedly engaged according to the principles of the present invention;

FIG. 25 is a cross-section view along lines A—A of FIG. 24, showing the screw partially threadedly engaged;

FIG. 26 is a cross-sectional view along lines A—A of FIG. 24, showing the screw in a fully engaged position.

DETAILED DESCRIPTION OF THE PREFERRED EMBODIMENTS

The present invention relates to a milling cutter 10, such as shown in FIG. 1. The ball nose milling cutter 10 includes a tool holder 12 which supports a cutting tool insert 14 which is secured to tool holder 12 by a screw 16. It should be noted that although the illustrative examples show a ball nose-type milling cutter, other flat bottom and back draft inserts may be used with the present invention as will be clear to an artisan skilled in the art of milling cutters.

Figure 14:
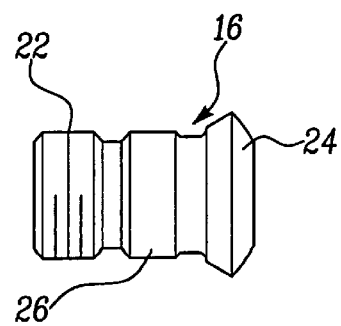
FIG. 14 is a side view of a screw used for securely mounting the cutting tool insert in the tool holder according to the present invention.

With reference to FIG. 2, a cross-sectional view along line 2—2 of FIG. 1 is shown. In FIG. 2, screw 16 is shown securely mounting cutting tool insert 14 to tool holder 12. Tool holder 12 is provided with an internally threaded portion 18 and a screw seat portion 20. Internally threaded portion 18 receives threaded portion 22 of screw 16, while a screw head 24 is seated in screw seat portion 20. A side view of screw 16 is shown in FIG. 14 and includes threaded portion 22, head portion 24, and an intermediate cylindrical portion 26. The intermediate cylindrical portion 26 is designed to abut against the internal surface of a through-hole 30 disposed in cutting tool insert 14, as shown in FIG. 9.

Figure 10:
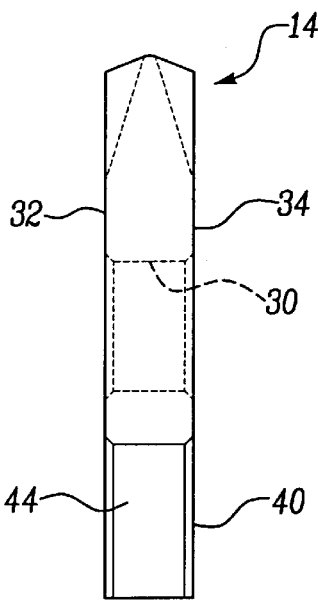
FIG. 10 is a side view of the cutting tool insert shown in FIG. 9.
Figure 9:
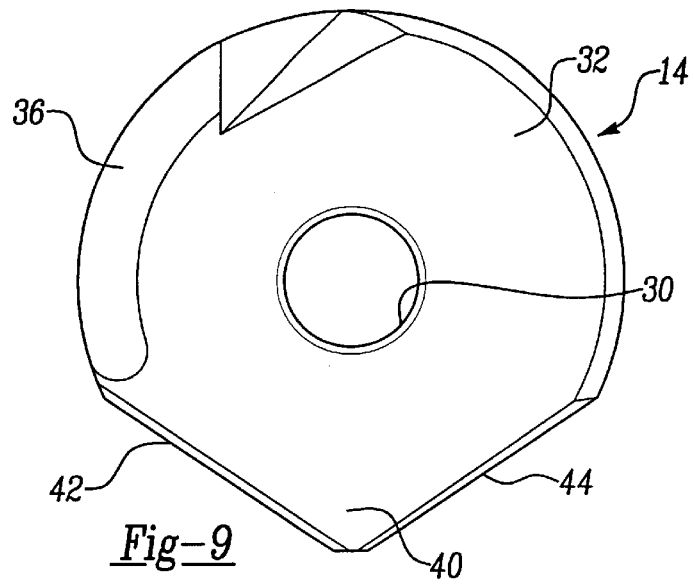
FIG. 9 is a plan view of a cutting tool insert according to the principles of the present invention.

The cutting tool insert 14, as shown in FIGS. 9 and 10, includes first and second side surfaces 32, 34, respectively, each of the first and second sides 32, 34 include a cutting surface 36 along at least one edge thereof. Cutting tool insert 14 is also provided with a V-shaped seat portion 40 which is defined by first and second surfaces 42, 44, respectively. First and second surfaces 42,44 are generally perpendicular to first and second side surfaces 32,34.

Figure 7:
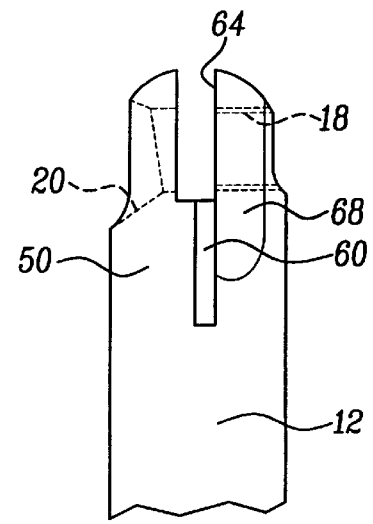
FIG. 7 is a fourth partial side view of the tool holder according to the principles of the present invention.
Figure 8:
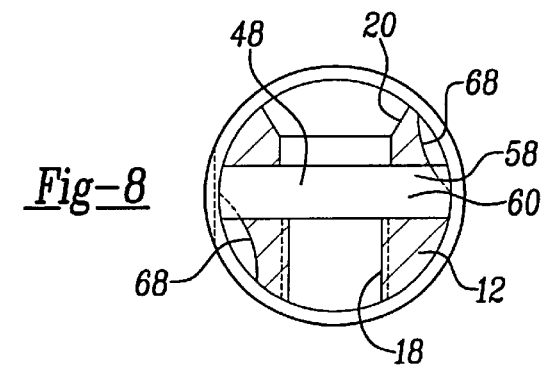
FIG. 8 is a cross-sectional view taken along lines 8—8 of FIG. 4.

V-shaped seat portion of cutting tool insert 14 is designed to be seated in a V-pocket 48 of tool holder 12. With reference to FIGS. 3–8, tool holder 12 will be described in greater detail. In FIGS. 5 and 7, as noted previously, tool holder 12 includes an internally threaded portion 18 and a screw head seat portion 20 which are provided in a cutting end portion 50 of tool holder 12. Tool holder 12 is also provided with a mounting end potion 52 which is shown with a flat 54 which assists in securely mounting tool holder 12 in a milling machine. With reference to FIGS. 4 and 6, V-pocket 48 is defined by first and second diagonal surfaces 58 and 60, respectively. First and second diagonal surfaces 58, 60 define the lower surfaces of a slot 64 defined in the cutting end portion 50 of tool holder 12. Slot 64 is formed by having one-half of each side of said slot machined at one-half a thickness of a cutting tool insert 14 from a centerline of tool holder 12. In other words, first and second diagonal surfaces 58 and 60 are machined into cutting end portion 50 on opposite sides of a centerline of tool holder 12. In addition, first and second diagonal surfaces 58, 60 are preferably disposed at approximately 110° with respect to one another so as to form V-pocket 48. It should be noted that other angles may also be used. The angle between first and second surfaces 58, 60 is designed to be equal to the angle between first and second surfaces 42,44 of V-shaped seat portion 40 of cutting tool insert 14.

Tool holder 12 is also provided with cut-away portions 68 which provide a clearance for the cutting surfaces 36 of cutting tool insert 14.

Figure 15:
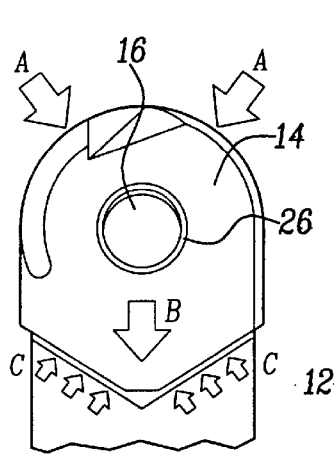
FIG. 15 is a schematic illustration of the forces applied to a cutting tool insert during a cutting operation.
Figure 16:
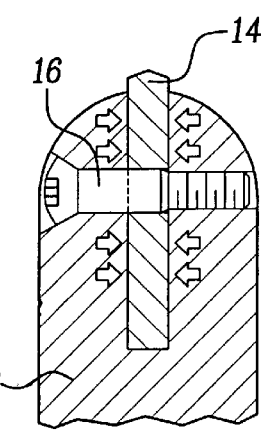
FIG. 16 is a schematic illustration of the forces applied to the side surfaces of a cutting tool insert of the present invention.
Figure 17:
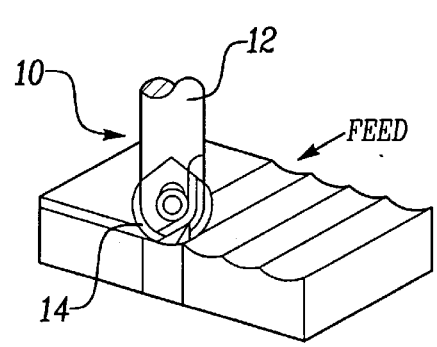
FIG. 17 is an illustration of a step-over line milling technique.
Figure 18:
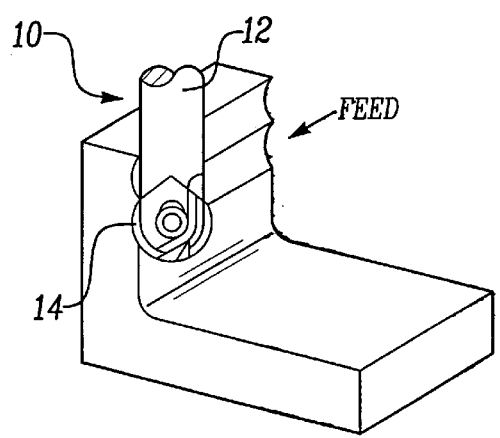
FIG. 18 is an illustration of a side milling technique.
Figure 19:
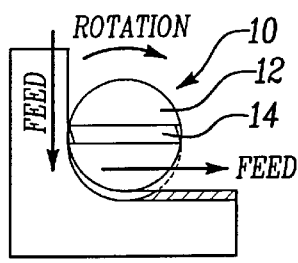
FIG. 19 is an illustration of a corner radius milling technique.

With reference to FIGS. 15 and 16, the forces applied to cutting tool insert 14 will be described. The V-pocket design gives a truly positive seat for cutting tool insert 14 and will not allow insert movement when milling with side thrust. The V-pocket 48 allows for a perfect alignment for centering of insert 14 with tool holder 12, so that insert 14 will run concentric to the tool holder 12 in its operation. The V-shaped seating portion 40 on cutting tool insert 14 aids in counter-acting lateral forces when being used in the cutting mode. As shown in FIG. 15, diagonal forces represented by arrows A cause cutting tool insert 14 to seat tighter into V-pocket 48 as illustrated by arrow B. The diagonal forces applied to cutting tool insert 14 are counteracted by diagonal forces illustrated by arrows C from first and second diagonal surfaces 58, 60 of tool holder 12. The V-pocket seating eliminates mismatch when changing to fresh inserts 14 and also eliminates the need to program new length or diameter offsets. Another feature of the present invention as shown in FIG. 15 is that when screw 16 is inserted to securely mount cutting tool insert 14 to tool holder 12, intermediate cylindrical portion 26 of screw 16 (FIG. 14) acts as a rigid cam-locking or clamping device for pressing against through-hole 30 of cutting tool insert 14 and causing V-shaped seat portion 40 to seat tightly in V-pocket 48.

With reference to FIG. 16, cutting tool insert 14 is shown in slot 64 of tool holder 12. Screw 16, when tightened provides a "sandwiched" clamping on insert 14 for providing rigidity to cutting tool insert 14.

Cutting tool inserts 14 can be made of carbide, coated carbide, cermet, hardened steel or other suitable materials. Tool holder 12 is preferably made of heat-treated steel.

Figure 11:
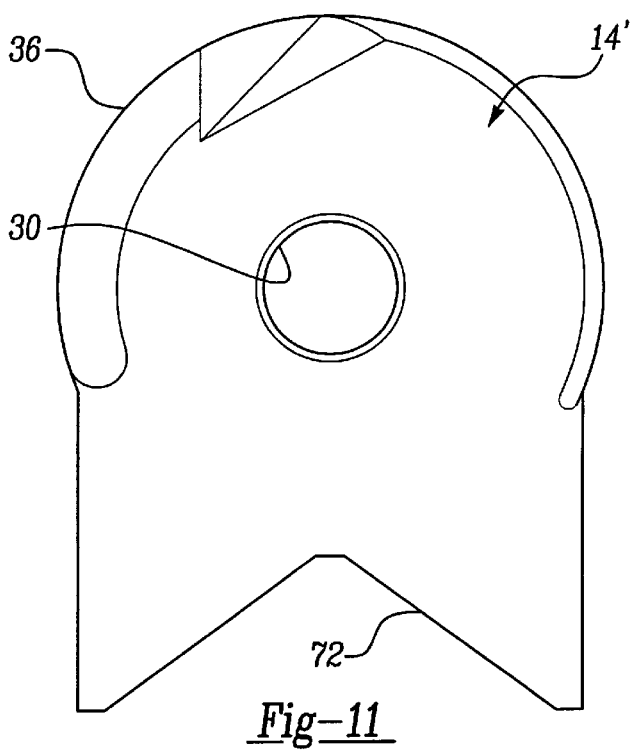
FIG. 11 is a plan view of a cutting tool insert according to a second embodiment of the present invention.
Figure 12:
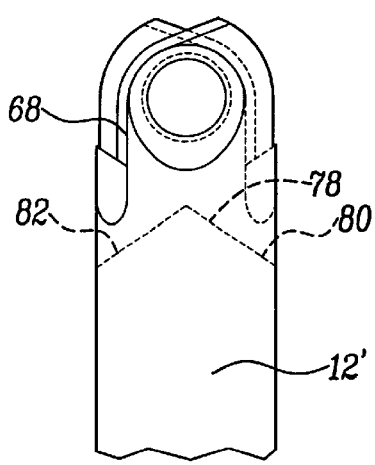
FIG. 12 is a partial side view of a tool holder according to a second embodiment of the present invention.
Figure 13:
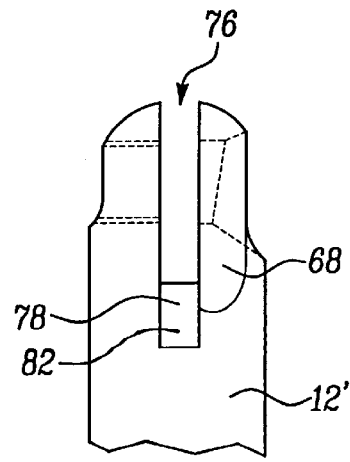
FIG. 13 is a second partial side view of a tool holder according to the second embodiment of the present invention.

With reference to FIGS. 11–13, a second embodiment of the present invention will now be described wherein the common elements disclosed in the first embodiment of the present invention will be designated with like-reference numerals. In FIG. 11, a cutting tool insert 14' is shown having a through-hole 30 and cutting surface 36 disposed along at least one edge of a first side thereof. Cutting tool insert 14' is provided with a V-shaped seating portion 72 which is inverted in comparison to V-shaped seat portion 40 of cutting tool insert 14 of the first embodiment of the present invention. Cutting tool insert 14' is received in a slot 76 shown in tool holder 12' of FIG. 13. Slot 76 is provided with a V-pocket 78 having an inverted V-shape with respect to V-pocket 48 according to the first embodiment of the present invention. V-pocket 78 is formed by first and second diagonal surfaces 80 and 82, respectively. Each of the first and second diagonal surfaces 80 and 82 are formed by machining diagonal surfaces, each having a width approximately equal to a width of the insert 14'. First and second diagonal surfaces 80 and 82 are again preferably disposed at approximately 110° relative to one another (although other angles may be used).

A benefit of each of the above described embodiments of the present invention is that the V-pockets 48, 78 formed in holders 12, 12' are obtained by providing straight through machining operations which greatly simplify the manufacturing of the V-style pocket allowing for a near perfect match with the V-shaped seat portion 40, 72 of cutting tool inserts 14, 14', respectively.

Figure 20:
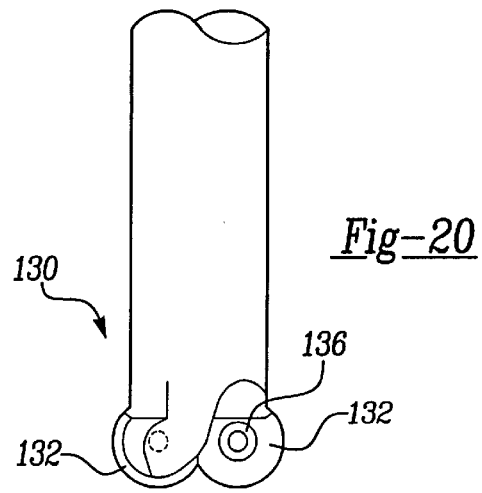
FIG. 20 is an illustration of a conventional toroid cutter.

The present invention also relates to a cutting tool insert 90 such as shown in FIG. 22. The cutting tool insert 90 is a single piece toroid cutting tool insert which offers many advantages over other cutting tool insert designs. A conventional toroid cutter 130 is shown in FIG. 20. A conventional toroid cutter 130 will include at least two round inserts 132 that are fastened to a tool holder 134, typically by screws 136 or clamps. However, the multitude of elements result in an unacceptable tolerance stack situation. The tolerance stack refers to how much variation is possible in the cutting edge location of each insert 132. The tolerance stack is comprised of the variances in the outside diameter among the round inserts 132, the inside diameter of the round inserts through which a threaded fastener, such as a screw 136, is inserted, the location of the insert mounting holes, and the outside diameter of the fastener 136.

Figure 21:
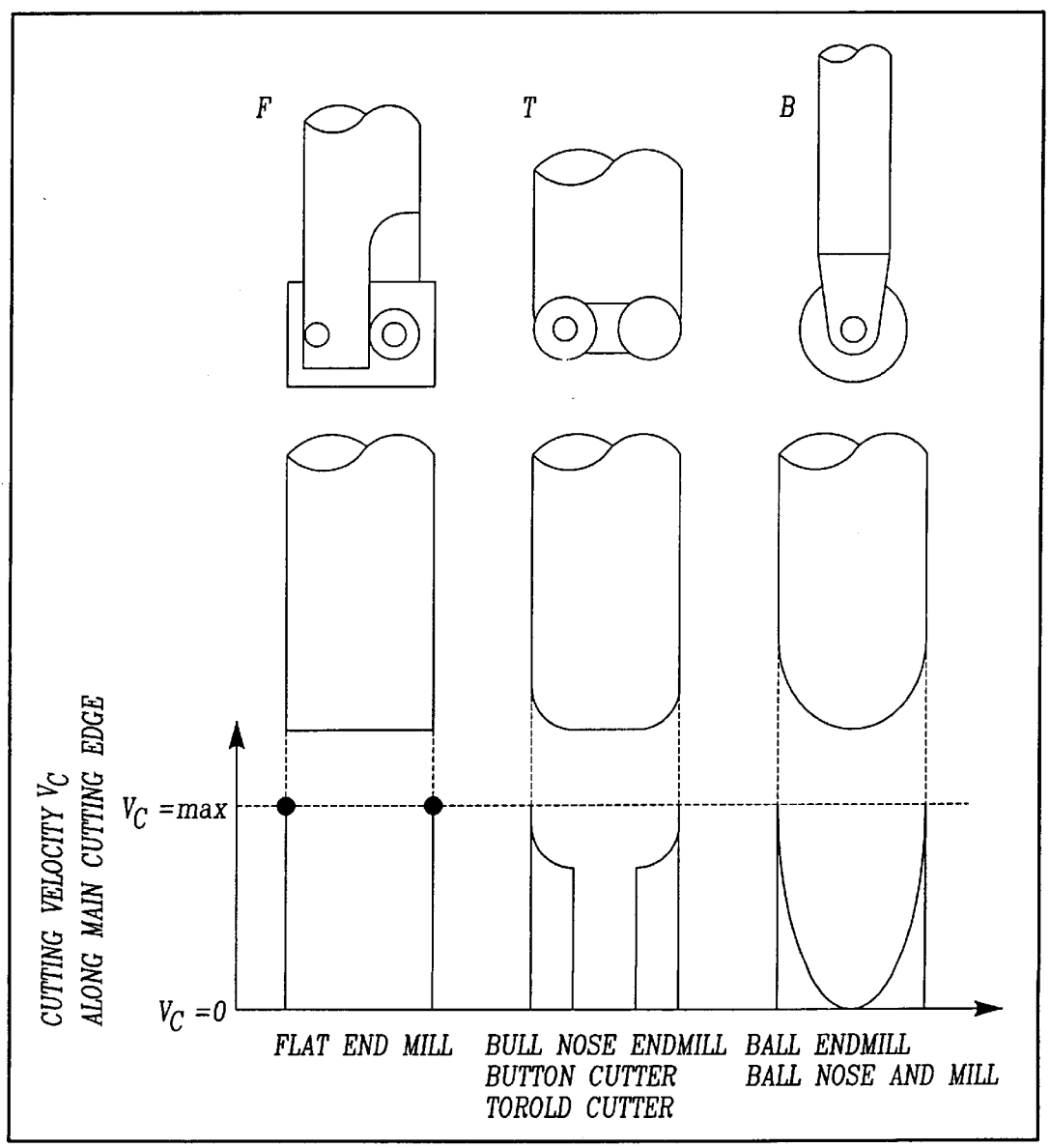
FIG. 21 is a chart of the cutting speed profiles along the cutting edge for the three most common cutters.

FIG. 21 represents the cutting speed profiles of the three most popular cutters. As FIG. 21 illustrates, the toroid cutter (T) has distinct advantages over the ball nose cutter (B) and the flat end cutter (F). The toroid cutter (T) does not have a location along the cutting edge where the cutting velocity is zero, unlike the ball nose cutter (B). The improved cutting performance of the toroid cutter results in a superior surface finish on the workpiece and longer tool life. In order to produce a sculpted finish with a flat end cutter (F), a five axis milling machine is required.

Referring now to FIG. 22, a toroid insert 90 is shown having a substantially flat body member 92, which includes a cutting portion 94 located at a first end and a seat portion 96 located at a second end. Referring now also to FIG. 23, the body member 92 also has a first face 98 and a second face 99, each of which intersects with a peripheral edge 102. As illustrated in FIG. 22, the cutting portion 94 has a first cutting lobe 100 and a second cutting lobe 101, each of which is shown as a circular segment. It should be understood, however, that the cutting lobes 100 and 101 may also be arcuate. The intersection of the first face 98 with the peripheral edge 102 forms a first cutting edge 104 along first cutting lobe 100. Likewise, the intersection of second face 99 with the peripheral edge 102 forms a second cutting edge 105 along second cutting lobe 101. First and second cutting edges 104 and 105 are diametrically opposed so that both cutting edges 104 and 105 cut metal as the tool is spinning.

The cutting portion 94 also has a void 106 disposed at the center line of body member 92 between first cutting lobe 100 and second cutting lobe 101. One of a first relief 110 and a second relief 111 is disposed adjacent first and second cutting lobes 100 and 101, respectively. First and second reliefs 110 and 111 are formed by removing material from the cutting portion 94 of the body member 92. As can be seen from FIGS. 22 and 23, the void 106 is V-shaped and the first and second cutting lobes 100, 101 are separated on each side of said void 106 by a distance greater than a radius of curvature of the cutting lobes 100, 101. FIGS. 22 and 23 illustrate the V-shaped void 106 being defined by a pair of diagonal surfaces 106a, 106b which each extend from one cutting lobe to the other and intersect at a centerline of the body member 92. A hole 108 is disposed in the body member 92. Although the preferred embodiment of the present invention discloses the pocket 114 as V-shaped as illustrated, and the seat portion 96 of the insert 90 is also substantially V-shaped as seen in FIG. 22, one skilled in the art would recognize that the novel toroid cutting tool insert 90 may incorporate any sufficient seat geometry.

A drawback of using a ball nose end mill as shown in FIG. 21 is the width of cut that is available. If the cutting is done with one tool diameter, the only way to increase the amount of material removed is to increase the depth of cut, however as the depth of cut is increased, the surface finish is diminished. As the depth of cut is increased, more overlap is required with each tool pass to improve the surface finish. However, as the amount of overlap is increased in a machining operation, more cutting passes are required. In order to obtain a two-fold increase in the surface finish of the workpiece, the required machining time will double. The decision becomes whether an improved surface finish or a shorter machining time is desired. If less machine time is desired, the workpiece will need more hand finishing in order to make the surface finish suitable. Furthermore, a ball nose insert suffers from premature wear because of its design.

Toroid cutters have proven to be an effective alternative to overcome the shortcomings associated with the ball nose cutter. However, the stacked up tolerance shortcomings of the conventional toroid cutter, described above, can inhibit the rotational speeds of the machine spindle because of the centrifugal forces exerted on the machine tool. The present invention eliminates the shortcomings of both the conventional toroid cutter and ball nose cutter while integrating their advantages. The toroid insert 90 of the present invention does not have a point on the cutting portion 94 where the cutting speed is zero, which results in extended tool life. Because the cutting tool insert 90 of the present invention has first and second cutting lobes 100 and 101, a greater rate of material removal resulting in a flat machined surface can be achieved than with a ball nose cutter, resulting in fewer tool passes and less machine time. Furthermore, the toroid design provides for a smoother finish, which is especially important when machining a mold because less hand finishing will be required.

The toroid insert 90 has first and second cutting lobes 100 and 101 that are integrated with body member 92 to form a one-piece cutting tool insert, eliminating the tolerance stack shortcomings of the conventional toroid insert. The first and second cutting edges 104 and 105 make uniform contact with the workpiece which provides increased milling accuracy and repeatability along with balanced chip loads resulting from the increased insert precision. The step of matching the button inserts and compensating for other variations in the conventional toroid cutter 130 is eliminated.

Because of improvements provided by the present invention, the toroid cutting tool insert 90 can be operated at a feed rate three times that of a conventional toroid cutter 130. The higher feed rate is made possible by the one-piece insert design which eliminates the undesirable centrifugal forces that limit a conventional toroid cutter 130. The one piece insert design 90 also allows the insert to be ground to a tolerance an order of magnitude more precise than conventional toroid cutters 130.

Referring now to FIG. 24, a cutting end portion 113 of an improved tool holder 112 is shown. Tool holder 112 is similar to tool holder 12 described in detail above. The tool holder 112 has a V-shaped pocket 114 for receiving a cutting tool insert 14 having a corresponding V-shaped seat portion according to the present invention. A screw 116 is provided to secure the insert to the tool holder 112.

Referring now to FIG. 25, a cross-sectional view of the tool holder 112 of the present invention is shown with the screw 116 partially threadedly engaged in the tool holder 112. The screw 116 has a screw head 117 and body 118, the body 118 includes a threaded portion 119 and shoulder 120. The V-shaped pocket 114 is formed in the same manner as has been disclosed in detail above. It should be noted that although the preferred embodiment of the present invention discloses a substantially V-shaped pocket 114, one skilled in the art would recognize that variations in pocket geometry may be substituted.

The tool holder 112 has a screw hole 122 passing through the tool holder 112 whereby the screw hole 122 intersects pocket 114. The screw hole 122 has a clearance portion 123 disposed in a first half 126 of the tool holder 112. A screw head seat portion 125 is disposed at a peripheral side of the clearance portion 123 of the screw hole 122. The screw hole 122 also includes an internally threaded portion 127 disposed in a second half 128 of the tool holder 112.

As previously described, the pocket 114 provides a location for seating the cutting tool insert 14. In the preferred embodiment of the present invention, the distance between the hole 30 of insert 14 and an apex of seat portion 40 of insert 14 is equivalent to the distance from the center line of the clearance portion 123 of tool holder 112 to an apex of the pocket 114. The clearance portion 123 of tool holder 112 is oblong, which provides clearance for axial movement of screw head 117 along a center line of the tool holder 112.

The internally threaded portion 127 of screw hole 122 is offset from the clearance portion 123 along the center line of the tool holder 112 toward the apex of the pocket 114. When the screw 116 is threadedly engaged in the tool holder 112, as shown in FIG. 25, a center line of the screw 116 is angularly offset from being perpendicular to the center line of the tool holder 112. The insert 14 is seated in the tool holder 112. As the threaded portion 119 of the screw 116 is threadedly engaged in the internally threaded portion 127 of screw hole 122, the shoulder 120 of screw 116 rotates within the hole 30 of the cutting tool insert 14. As a portion of the screw head 117 contacts the screw head seat portion 125, the screw 116 begins to bend. As the screw 116 is threadedly engaged in threaded portion 127 of screw hole 122, the screw head 117 engages the screw head seat portion 125 until the screw head 117 is substantially engaged with the screw head seat portion 125 forcing the shoulder 120 of the screw 116 against a portion of a surface within the hole 30 of the insert 14. The force created by bending the screw 116 forces the insert 14 to positively seat into the pocket 114.

Referring now to FIG. 26, the screw 116 is shown fully threadedly engaged in the tool holder 112. The oblong shape of the screw head seat portion 125, along with the angularly offset screw 116, allows the screw 116 to operate as a cam as the screw 116 is threadedly engaged with the tool holder 112. The internal threaded portion 127 is offset at approximately one degree to one degree thirty minutes upward. The counter sink on the holder portion is offset downward approximately five thousandths (0.0005) of an inch allowing for a downward or camming type motion. Thus, substantial seating force is achieved which provides more precise insert alignment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cutting tool insert comprising:
    a substantially flat body member having a cutting portion located at a first end and a seat portion located at a second end, said seat portion for seating said cutting tool insert in a tool holder;
    said flat body member having a first face and second face;
    said cutting portion having a first arcuate cutting lobe and second arcuate cutting lobe symmetrically disposed adjacent to a centerline of said body member;
    each of said first cutting lobe and second cutting lobe having a peripheral edge adjacent to each of said first face and second face;

a first cutting edge disposed on said first cutting lobe and a second cutting edge disposed on said second cutting lobe, said first cutting edge and second cutting edge being substantially disposed at an intersection of said peripheral edge and one of said first face and second face;

said cutting portion having a void disposed at the centerline of said body member between said first and second cutting lobes, said void comprising a first relief disposed adjacent to said first cutting lobe and a second relief disposed adjacent to said second cutting lobe wherein an entirety of said first cutting edge and an entirety of said second cutting edge are spaced apart from one another on opposite sides of said void by a distance greater than a radius of curvature of said first and second cutting lobes, said void being V-shaped and defined by a pair of diagonal surfaces which extend from one of the first and second cutting lobes to the other and intersect at a centerline of said body member; and said body member having a hole passing therethrough.

2. The cutting tool insert of claim 1, wherein said cutting lobes are circular segments.

3. The cutting tool insert of claim 1, wherein said seat portion is substantially V-shaped.

4. The cutting tool insert of claim 1, wherein said seat portion includes a first seat edge and second seat edge being adjacent and substantially perpendicular to said first and second faces, said first and second seat edges defining said seat portion for seating said cutting tool insert in a tool holder.

5. The cutting tool insert of claim 4, wherein said seat portion is substantially V-shaped.

6. The cutting tool insert of claim 5, wherein said cutting lobes are circular segments.

7. A cutting tool insert for use in a tool holder, comprising:

a substantially flat body member having a cutting portion located at a first end and a seat portion located at a second end;

said flat body member having a first face and second face;

said cutting portion having a first arcuate cutting lobe and a second arcuate cutting lobe symmetrically disposed adjacent to a centerline of said body member;

each of said first cutting lobe and said second cutting lobe having a peripheral edge adjacent to each of said first face and second face;

a first cutting edge disposed on said first cutting lobe and a second cutting edge disposed on said second cutting lobe, said first cutting edge and second cutting edge being substantially disposed at an intersection of said peripheral edge and one of said first face and second face;

said cutting portion having a V-shaped void disposed at a centerline of said body member between said first and second cutting lobes, said V-shaped void being defined by a pair of diagonal surfaces which intersect at the centerline of said body member, said V-shaped void extending a distance between said first and second cutting lobes by a distance greater than a radius of curvature of said first and second cutting lobes, said V-shaped void comprising a first relief disposed adjacent to said first cutting lobe and a second relief disposed adjacent to said second cutting lobe; and said body member having a hole passing therethrough.

8. The cutting tool insert of claim 7, wherein said cutting lobes are circular segments.

* * * * *